United States Patent [19]
Poborsky

[11] Patent Number: 5,671,979
[45] Date of Patent: Sep. 30, 1997

[54] VEHICLE HAVING A CONTAINMENT VESSEL AND AUGER DISCHARGE DEVICE

[76] Inventor: Gary A. Poborsky, 483 Helsel Rd., Johnstown, Pa. 15904

[21] Appl. No.: 601,454

[22] Filed: Feb. 14, 1996

[51] Int. Cl.[6] ..................................................... B60P 1/40
[52] U.S. Cl. ........................... 298/17 R; 298/7; 414/469; 414/526
[58] Field of Search ..................... 298/7, 17 R; 414/526, 414/469, 472

[56] References Cited

U.S. PATENT DOCUMENTS

| | | |
|---|---|---|
| 1,165,760 | 12/1915 | Craine . |
| 2,601,049 | 6/1952 | Neighbour . |
| 2,711,814 | 6/1955 | McCarthy . |
| 2,926,772 | 3/1960 | Reed . |
| 3,057,522 | 10/1962 | Reed . |
| 3,090,507 | 5/1963 | Gutekunst et al. . |
| 3,100,052 | 8/1963 | Brembeck . |
| 3,107,825 | 10/1963 | Reed . |
| 3,138,242 | 6/1964 | Matheson et al. . |
| 3,145,855 | 8/1964 | Plugge et al. . |
| 3,151,749 | 10/1964 | Long . |
| 3,197,015 | 7/1965 | Lewis et al. . |
| 3,283,925 | 11/1966 | Gutekunst . |
| 3,300,070 | 1/1967 | Schwartz ........................ 298/17 R |
| 3,356,234 | 12/1967 | Seekamp et al. . |
| 3,555,997 | 1/1971 | Van Der Lely . |
| 3,616,747 | 11/1971 | Lapeyre . |
| 3,722,715 | 3/1973 | Young . |
| 3,760,933 | 9/1973 | Maldeis et al. . |
| 4,014,271 | 3/1977 | Rohlf et al. ........................ 414/526 |
| 4,036,411 | 7/1977 | Westhoff . |
| 4,057,152 | 11/1977 | Weaver . |
| 4,426,018 | 1/1984 | Ward ........................ 222/1 |
| 5,000,658 | 3/1991 | Niskanen ........................ 198/550.1 |
| 5,002,595 | 3/1991 | Kehr ........................ 55/312 |
| 5,108,471 | 4/1992 | Poborsky ........................ 55/186 |
| 5,178,507 | 1/1993 | Friesen ........................ 414/326 |
| 5,340,265 | 8/1994 | Grieshop ........................ 414/526 |
| 5,516,253 | 5/1996 | Linscheid et al. ........................ 414/526 |

FOREIGN PATENT DOCUMENTS

2 168 759  6/1986  United Kingdom .

Primary Examiner—Karen B. Merritt
Assistant Examiner—Gregory A. Morse
Attorney, Agent, or Firm—Banner & Witcoff, Ltd.

[57] ABSTRACT

A self-unloading vehicle having a pivotable material containment vessel and an auger discharge device structurally coupled to the vessel to discharge the contents of the vessel. The material containment vessel includes a convex rear wall with an opening therein. The auger discharge device includes an auger and a tubular shell structurally coupled to the material containment vessel. The tubular shell encases the auger on both sides of the vessel opening and includes first and second longitudinal ends, and an opening between the first and second ends. The opening in the tubular support is in fluid communication with the opening in the material containment vessel. The auger extends partially through the opening in the rear wall of the material containment vessel and into the interior of the material containment vessel in a manner which eliminates all inaccessible regions inside the material containment vessel such that all of the material in the vessel can be discharged. A motor is provided which rotates the shaft to convey material from the interior of the material containment vessel to a discharge port in the tubular shell.

28 Claims, 5 Drawing Sheets

VEHICLE HAVING A CONTAINMENT VESSEL AND AUGER DISCHARGE DEVICE

FIELD OF THE INVENTION

The present invention relates generally to a vehicle having a material containment vessel and an auger discharge device to discharge the contents of the vessel. More particularly, the present invention relates to a self-unloading vehicle having a pivotable material containment vessel and an auger discharge device structurally coupled to the vessel to discharge the contents of the vessel.

BACKGROUND OF THE INVENTION

Transport trucks are known in the art for collecting and transporting various types of debris, such as sludge, sewage, hazardous waste, dry materials, etc. These trucks typically include a frame and a material holding container or tank mounted on the frame. The material holding container is typically pivotable relative to the truck frame to facilitate removal of the debris therefrom. When the material holding container is filled with debris, the track is driven to a dump site and the debris is discharged. However, prior transport trucks with discharge systems have not been proven to be completely satisfactory.

Prior transport trucks have used vacuum and pneumatic systems for discharging debris from the material holding container of a truck. These vacuum and pneumatic systems use either a vacuum or a stream of pressurized fluid to propel the debris from the material holding container through a discharge hose. These vacuum and pneumatic discharge systems may be acceptable for discharging small, lightweight materials. However, vacuum and pneumatic systems are not suited for discharging heavy, dense, wet, liquid or sludge-like materials from a truck container.

Other prior transport trucks include a simple dump system having a pivotable material holding container with a rear opening fitted with a pivoting rear door. When the material holding container is inclined relative to the truck frame, the rear door opens and the debris flows out of the container through the rear opening due to gravity. The rear opening and door typically cover a large portion of the rear section of the material holding container, and therefore, the debris is distributed over a relatively large area when dumped. Such dumping systems are not suitable for discharging debris from a material holding container into a small area, such as the intake conduit of an independent storage container, to store the debris for later removal. Further, if the size of the rear opening of the container is reduced to more precisely control the discharge area of the debris, the reduced-size rear opening is susceptible to blockage by densely packed debris or by large solid pieces of debris.

Other prior discharge trucks utilize an auger discharge device to discharge the contents of a pivotable material holding container. One such discharge truck is shown in FIGS. 1–3 and is designated by reference numeral 10. However, for the reasons described hereinafter, truck 10 has not been totally satisfactory for some applications.

Truck 10 includes a cab 12 and a frame 14 supported by a front axle unit 16 and dual rear axle units 18 and 20. A material holding container 22 is pivotally mounted on the vehicle frame 14 by connections 24 located on each side of the truck 10. An extensible hydraulic lifting cylinder 26 is located on each side of the truck 10 and extends between the truck frame 14 and a bottom support member on the material holding container 22. The container 22 includes a rear door 28 pivotally connected to the holding container 22 by a hinge 30 having a pivot pin 32. A hydraulic cylinder 34 is coupled to the top wall of the holding container 22 and the rear door 28 to pivot the rear door 28 open and closed about the pivot pin 32. An over center stop element 36 is attached to the rear door 28 near the hinge 30.

As shown in FIG. 2, an auger discharge device 40 is carried on the rear door 28 and is in flow communication with the interior of the material holding container 22. Auger discharge device 40 includes a centrally located, hollow, cylindrical elongated support tube 42 and an auger conveyor assembly 46. The support tube 42 has an opening 45 at its lower end which communicates with an opening 44 located in the rear door 28, and is attached thereto. Auger conveyor assembly 46 extends through the support tube 42, the openings 44 and 45, and into the interior of material holding container 22.

As shown in FIGS. 2 and 3 of the drawings, the conveyor assembly 46 includes an elongated hollow cylindrical casing 48 housing an auger, i.e., a helical screw 50 mounted on a rotatable shaft 52. As shown in FIG. 3 of the drawings, the upper portion of conveyor assembly 46 includes an electric drive motor 54 and a top bearing assembly 56 connected to the upper end of the shaft 52. The conveyor assembly 46 further includes a packing assembly 58 which includes standard rope packing 62 held in place by nuts 64 and 66 attached to bolts 68 and 70. A top plate 60 is attached to an annular flange 71 carded on the upper end of the casing 48. The lower end of the rotary shaft 52 is supported by a bottom bearing 80, and a conventional packing assembly, not shown, is also provided at the lower end of shaft 52.

As shown in FIG. 2 of the drawings, the conveyor assembly 46 includes a hollow discharge pipe 72 in flow communication with the interior of the casing 48. A flange 74 carried on the casing 48 is connected to an upper flange 76 on the end of support tube 42 to hold the casing 48 in place with respect to the support tube 42. The casing 48 has a cut-away portion forming an open trough portion 78 extending inside of the material holding container 22 permitting it to be in flow communication with the interior of holding container 22. A support bracket 82 extends between the exterior of the casing 48 and the inside surface of the rear door 28 to stabilize the lower end of the conveyor assembly 46. As shown in FIG. 2, the discharge device 40 in a non-discharge position does not extend vertically from holding container 22, but rather the longitudinal axis L of the discharge device 40 is inclined by an angle Z, approximately 17°–20°, from the vertical plane V. As shown in FIG. 2 of the drawings, the rotary shaft 52, the casing 48 and the support tube 42 are co-axial.

In operation, sludge or other debris is collected in the material holding container 22 in a conventional manner, for example, by vacuum suction or mechanical collection methods. When this material is to be discharged, the truck 10 is driven to a discharge site and the holding container 22 is pivoted from a horizontal non-discharge position to the discharge position shown in FIG. 1. In this position, the material contained in the holding container 22 flows under the force of gravity toward the rear door 28. In this position, the material could be discharged by activating the hydraulic cylinder 34 to pivot the rear door 28 around the pivot pin 32 into the open position. However, as previously described, this method of discharge is not suitable for discharging the debris into a restricted opening such as the conduit or trough of a collection container.

If the discharge device 40 is used to discharge the collected debris into a restricted space, when the holding container 22 is pivoted into the discharge position shown in FIG. 1, and the collected debris is in contact with the helical screw 50 in the open trough portion 78 of the auger conveyor assembly 46. From this position, an operator activates the motor 54 which rotates the shaft 52 causing the helical screw 50 to rotate and transport the debris from the interior of the holding container 22, through the casing 48 and out of the discharge pipe 72. After discharge of the collected debris has been completed, the motor 54 is stopped and the hydraulic lifting cylinders 26 are retracted so that the material holding container 22 returns to a non-discharge position.

However, a drawback of the truck and discharge system shown in FIGS. 1–3 is that it does not discharge all of the material in the interior region of the container 22. As best seen in FIG. 2, there is a region 84 located inside the container 22, between the exterior of the auger support shell 48 and the inside of rear door 28, which is inaccessible to the trough portion 78 and helical screw 50. Thus, this arrangement prevents all of the material inside of the container 22 from being discharged. This is undesirable, especially when the material is to be discharged is a potential contaminate, e.g., sludge, sewage, or hazardous waste, and less than total evacuation of the material poses significant safety concerns. Further, this auger discharging device 40 may include assembling difficulties and an unnecessary duplication of certain parts.

Therefore, it would be desirable to have a vehicle for transporting and discharging materials which is suited for totally discharging a pivotally mounted container having any one of a wide variety of materials therein, e.g., heavy, dense, wet, sludge-like materials or small, lightweight materials, into a small area to store the debris for later removal.

SUMMARY OF THE INVENTION

In view of the foregoing, it is a principal object of the present invention to provide a vehicle with an improved auger discharge device.

More specifically, it is an object of the invention to provide a vehicle with an auger discharge device which eliminates all inaccessible regions inside a material containment vessel such that all of the material in the vessel can be discharged.

Another object is to provide a vehicle with an auger discharge device which facilitates assembly and reduces the number of required parts.

These and other objects are achieved by the present invention which, according to one aspect, provides a vehicle for transporting and discharging materials. The vehicle includes a frame, a material containment vessel mounted to the frame, a tubular shell structurally coupled to the material containment vessel, an auger, and a motor for rotating the auger to convey material from the interior of the material containment vessel through the tubular shell to be discharged. The material containment vessel includes a rear portion with a rear wall and an opening therein. The tubular shell encases the auger on both sides of the opening and includes first and second longitudinal ends, a discharge port, and an opening between the first and second longitudinal ends. The opening of the tubular shell is in fluid communication with the opening of the material containment vessel. The auger extends at least partially through the opening of the rear wall of the material containment vessel and into the interior of the material containment vessel.

In another aspect, the invention provides a vehicle for transporting and discharging materials. The vehicle includes a frame, a material containment vessel pivotally mounted to the frame, a tubular shell structurally attached to the material containment vessel, and an auger. The material containment vessel has an interior and a rear portion with a rear wall defining the rear end of the interior and including an opening. The tubular shell includes first and second longitudinal ends, a discharge port, and an opening therein. The opening of the tubular shell is in fluid communication with the opening of the material containment vessel. The auger includes a shaft having first and second ends, a helically wound blade having external edges, and a generally cylindrical enveloping region. The perimeter of the enveloping region is defined by the external edges of the helically wound blade. The auger extends through the opening of the rear wall of the material containment vessel and into the interior of the material containment vessel. At least a portion of the enveloping region of the auger at every cross-section along its entire length from the first end to the second end is located external of the interior of the vessel. A motor is provided which rotates the shaft to convey material from the interior of the material containment vessel to the discharge port.

These and other objects and features of the invention will be apparent upon consideration of the following detailed description of preferred embodiments thereof, presented in connection with the following drawings in which like reference numerals identify like elements throughout.

DETAILED DESCRIPTION OF THE PREFERRED EMBODIMENT

Figure 1:
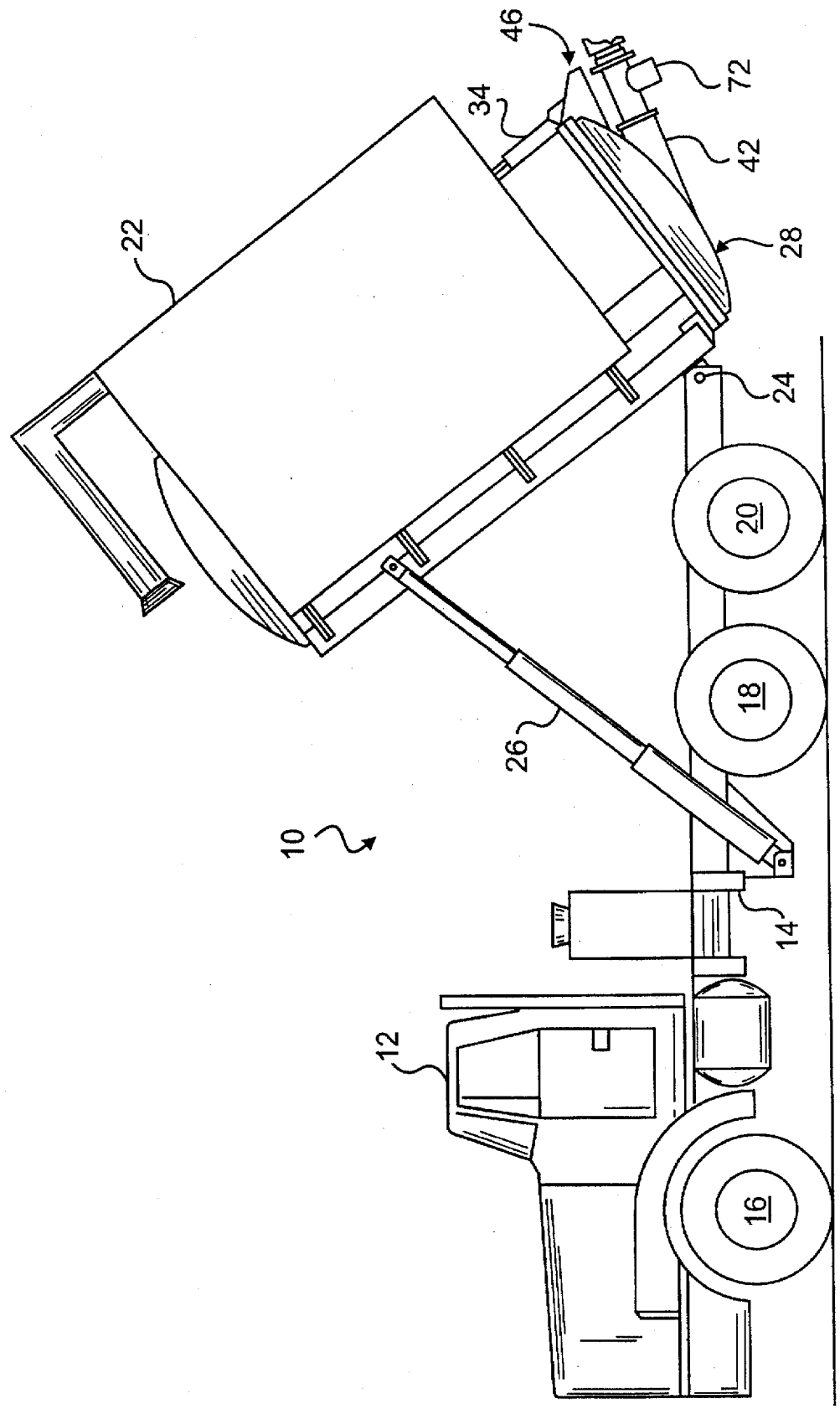
FIG. 1 is a side view of a prior art truck having a material holding container shown in a discharge position.
Figure 2:
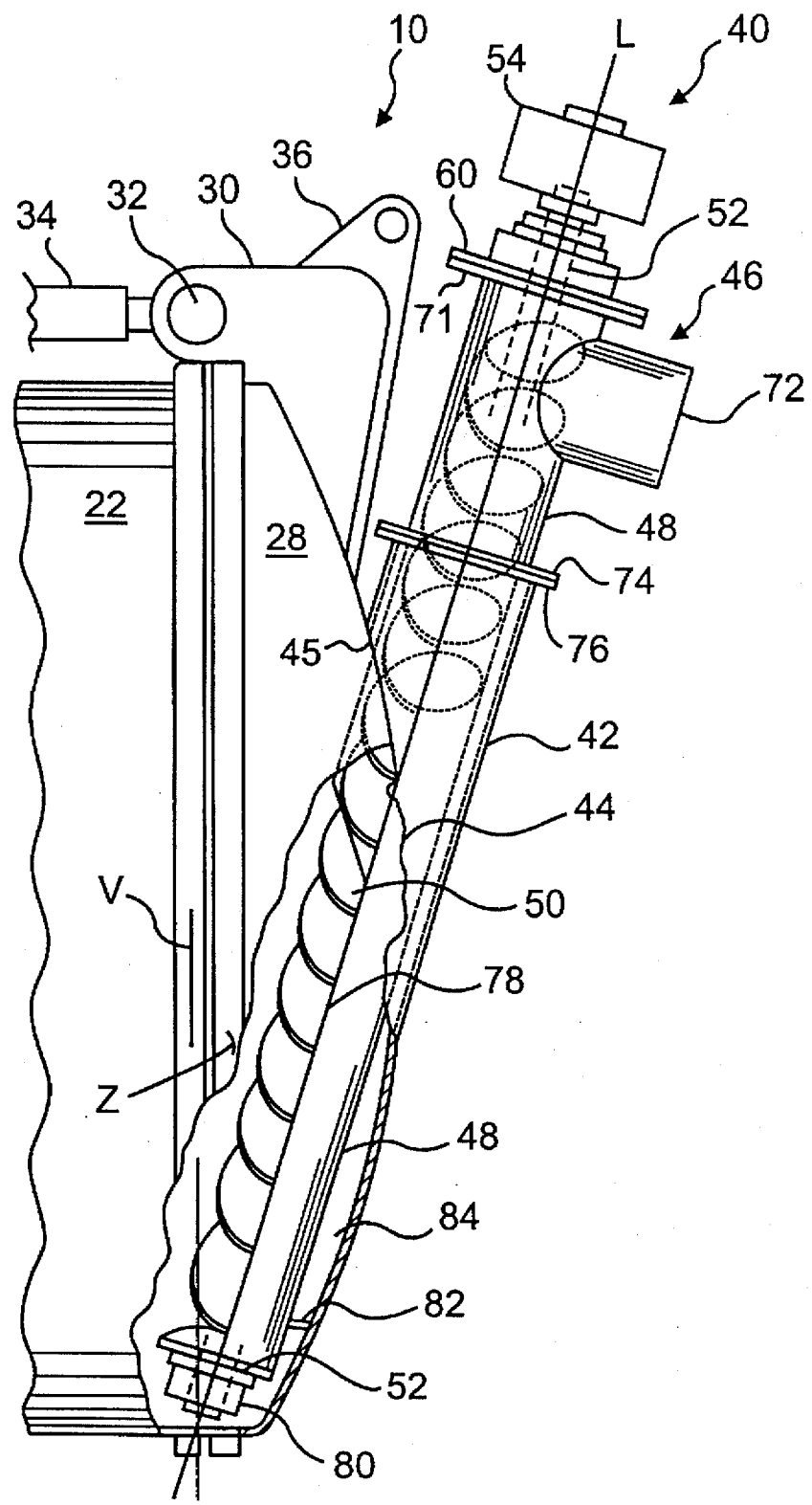
FIG. 2 is an enlarged sectional view of the auger discharge device extending into the interior of the material holding container of the prior art truck shown in FIG. 1, with the material holding container shown in a discharge position.
Figure 3:
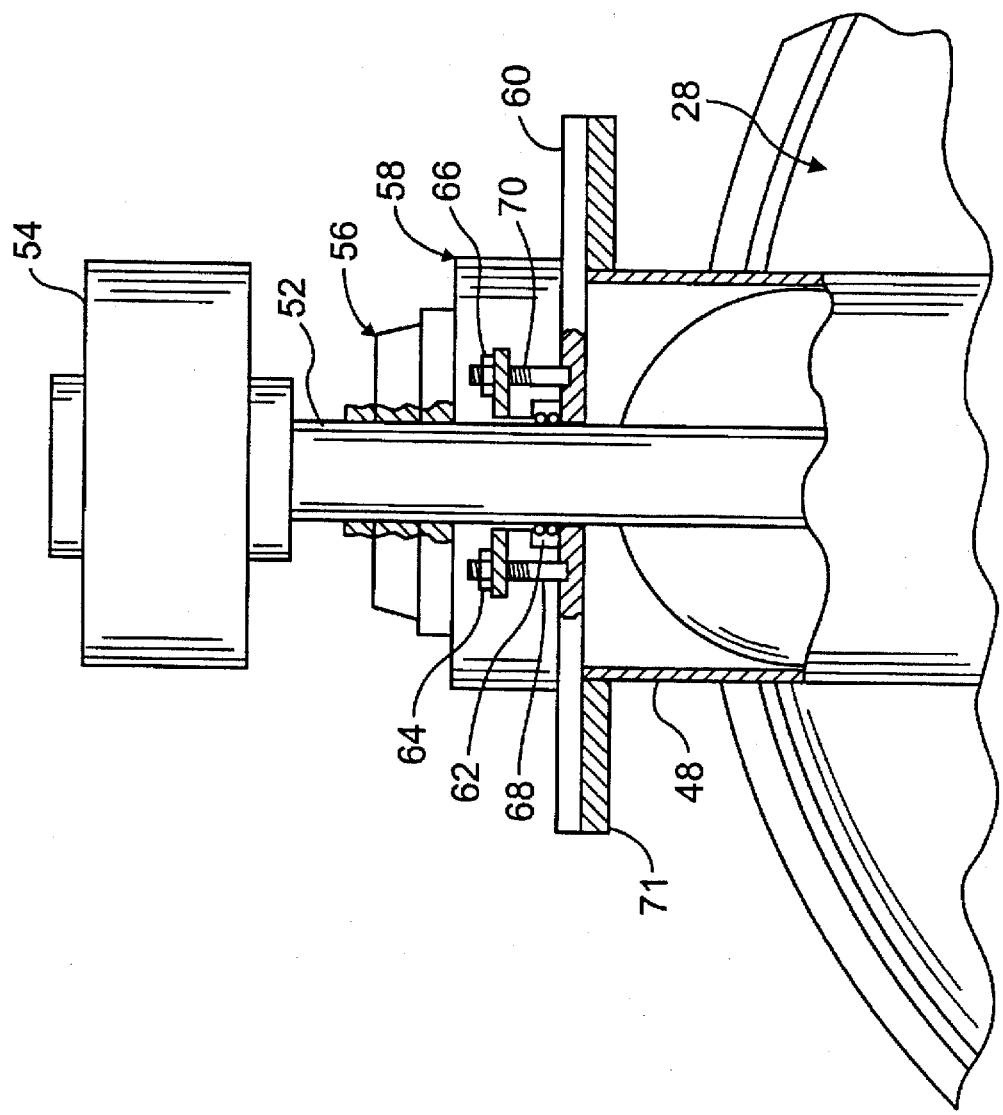
FIG. 3 is an enlarged sectional view of the upper end of the auger discharge device shown in FIG. 2.
Figure 4:
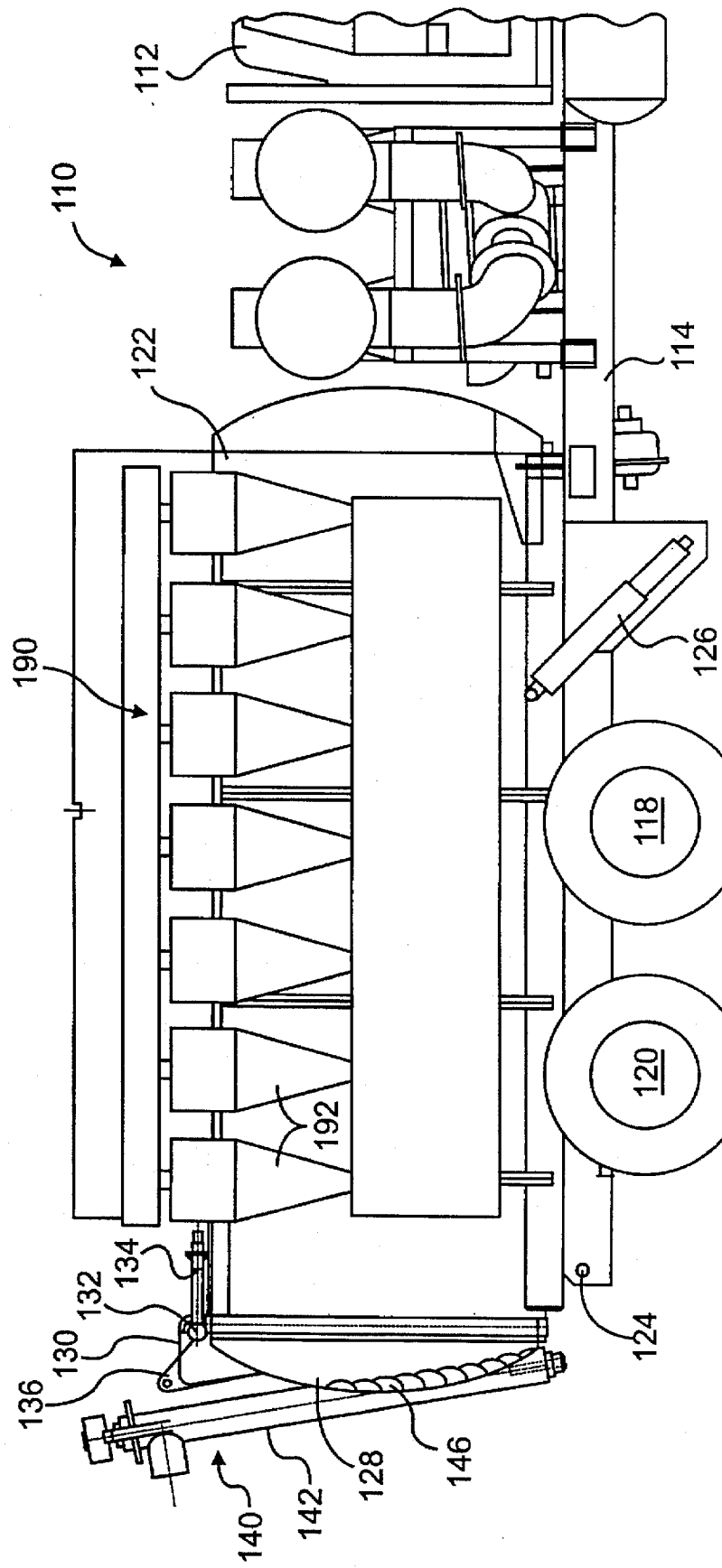
FIG. 4 is a side view of a vehicle having a material holding container in accordance with the present invention, shown in a non-discharge position.
Figure 5:
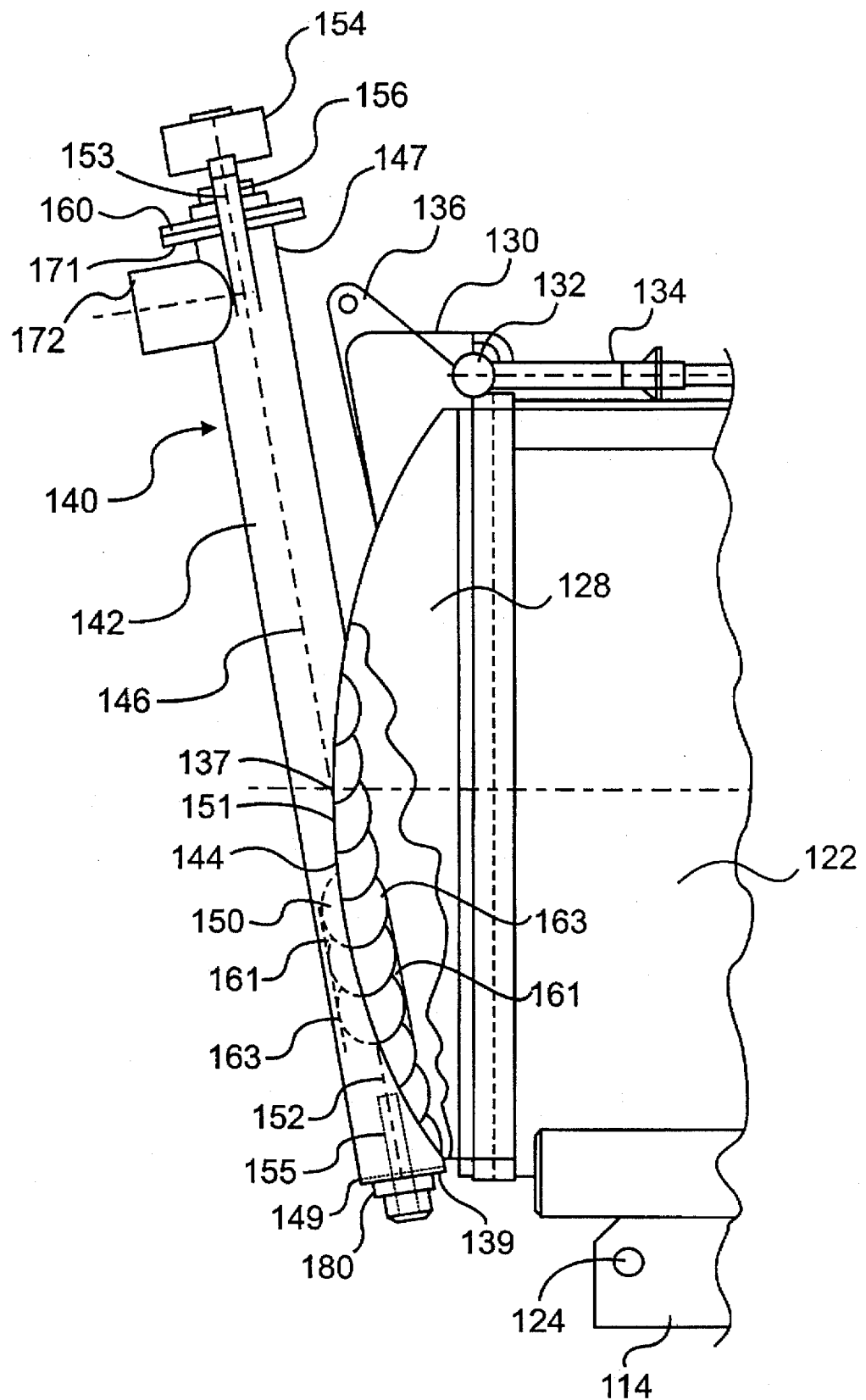
FIG. 5 is an enlarged sectional view of the auger discharge device and the material holding vessel of the vehicle shown in FIG. 4.

In the present invention, as pictured in FIGS. 4–5, a vehicle having a material containment vessel and an auger discharge device to discharge the contents of the vessel, is designated generally by reference numeral 110. As in the vehicle 10 of FIGS. 1–3, vehicle 110 preferably includes a cab 112, a frame 114 supported by front axle unit, not shown, and dual rear axle units 118 and 120. A material containment vessel 122 is pivotally connected to frame 114 at connections 124, and hydraulic lifting cylinders 126 are provided to impart pivotal movement between the material containment vessel 122 and the frame 114. The material containment vessel 122 includes a convex rear door 128 pivotally movable with respect to the remainder of the vessel 122 by a hinge 130 having a pivot pin 132 and a hydraulic cylinder 134. An over center stop element 136 is attached to the rear door 128 near the hinge 130.

Rear door 128 further includes an opening 144 therein for the purposes described in detail hereinafter. Opening 144 extends from at least the rearwardmost center section 137 of the convex rear door 128 to preferably the bottom forwardmost section 139 where the convex section terminates. Further, opening 144 is sufficiently wide to accommodate a portion of an auger discharge device 140 including a screw conveyor.

Auger discharge device 140 is laterally centrally located with respect to the rear door 128 and the vehicle 110, and includes an elongated support tube 142 and an auger conveyor assembly 146. As in the truck of FIGS. 1–3, in a non-discharge position, the auger discharge device 140 of vehicle 110 is preferably inclined by an angle between about 17°–20° from the vertical plane. Elongated support tube 142 includes an upper end 147, a lower end 149, and an opening 151 located therebetween, preferably closer to the lower end 149. The elongated support tube 142 is attached to the rear door 128, preferably at the outer surface of the door 128, and in such a manner that the opening 151 of the support tube 142 in fluid communication with the opening 144 of the material containment vessel 122. As shown in FIG. 4, the support tube 142 is located substantially entirely outside of the interior of the material containment vessel 122.

The auger conveyor assembly 146 includes an auger, e.g., a rotatable shaft 152 and a helical screw 150, mounted for rotation inside the elongated support tube 142. The rotatable shaft 152 includes upper and lower ends 153 and 155 which are respectively rotatably mounted to the upper and lower longitudinal ends 147 and 149 of the support tube 142. Preferably, a top plate 160 is attached to an annular flange 171 carried on the upper end 147 of the support tube 142. The upper end of the support tube 142 further includes a drive motor 154 and a beating assembly 156 for rotating the shaft 152, while the lower end of the support tube 142 includes a lower bearing assembly 180 for facilitating the rotation of shaft 152. Further, appropriate packing assemblies may be provides in a manner as previously described.

As shown in FIG. 5, the auger is mounted in the support tube 142 such that the elongate support tube 142 encases the auger on both sides of the rear wall opening 144, and the helical screw 150 of the auger extends at least partially through the rear wall opening 144 and into the interior of the material containment vessel 122 to be in fluid communication therewith.

Further, as is evident from the drawings, a generally cylindrical enveloping region 161 of the auger can be defined which extends along its length and has a perimeter defined by the external edges 163 of the helically wound blade 150. While a portion of the enveloping region 161 of the auger extends into the interior of the material containing vessel 122, at least a portion of the enveloping region 161 of the auger at any cross section along its entire length is located external of the interior of the material containment vessel 122. That is, the enveloping region 161 of the auger is not entirely located in the interior of the material holding vessel 122 at any cross sectional point of the auger along its length.

Further, in a preferred arrangement, vehicle 110 includes a wet and dry vacuum filtration and collection system 190 including cyclone separators 192 to facilitate washing of the material containment vessel 122 and the collection, filtration, and removal of certain types of material. Details of one such filtration and collection system 190 is disclosed in U.S. Pat. No. 5,108,471, which is hereby incorporated by reference. However, it is recognized that other filtration and collection systems may be used.

In operation, sludge or other debris is collected in the material containment vessel 122 in a conventional manner, for example, by vacuum suction or mechanical collection methods. When this material is to be discharged, the vehicle 110 is driven to a discharge site and the material containment vessel 122 is pivoted from a horizontal non-discharge position, as shown in FIG. 4, to a discharge position, similar to the position shown in FIG. 1. In this position, the material contained in the material containment vessel 122 flows under the force of gravity toward the rear door 128. In this position, the material could be discharged by activating the hydraulic cylinder 134 to pivot the rear door 128 around the pivot pin 132 into the open position. However, as previously described, this method of discharge may not be desirable in certain situations.

If the discharge device 140 is used to discharge the collected debris into a restricted space, the collected debris is in contact with the helical screw 150 of the auger when the material containment vessel 122 is moved into the discharge position. From this position, an operator activates the motor 154 which rotates the shaft 152 causing the helical screw 150 to rotate and transport the debris from the interior of the material containment vessel 122, through the elongated support tube 142 and out of the discharge pipe 172, which is mounted to the upper portion of the elongated support tube 142 and is in fluid communication therewith. After discharge of the collected debris has been completed, the motor 154 is stopped and the hydraulic lifting cylinders 126 are retracted so that the material containment vessel 122 returns to a non-discharge position.

It is apparent that this arrangement has numerous advantages over prior art systems. More specifically, with respect to the truck 10 shown in FIGS. 1–3, vehicle 110 discharges all of the material in material containment vessel 122 as there are no regions inside the vessel 122 which are inaccessible to the auger discharge device 140 which could collect material, when the vessel 122 is moved to its discharge position. Further, because the auger is attached to the support tube 142 outside of the vessel 122, assembly and repair is facilitated and no brackets inside the vessel are required to stabilize the auger. Additionally, in contrast to the truck of FIGS. 1–3, auger discharging device 140 of the present invention does not require a casing surrounding the auger in addition to the support tube 142, and therefore reduces the number of required parts.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A vehicle for transporting and discharging materials, the vehicle comprising: a frame;

a material containment vessel, said material containment vessel mounted to said frame and having an interior and a rear portion with a rear wall, said rear wall including an opening therein;

a tubular shell, said tubular shell structurally coupled to said material containment vessel and including first and second longitudinal ends, a discharge port, and an opening therein between said first and second longitudinal ends, said opening of said tubular shell in fluid communication with said opening of said material containment vessel;

an auger, said auger extending at least partially through said opening of said rear wall of said material containment vessel and into the interior of said material containment vessel, said tubular shell encasing said auger on both sides of said opening in the rear wall; and a motor for rotating the auger to convey material from the interior of the material containment vessel through the tubular shell to be discharged out the discharge port;

wherein said rear wall is convex having a rearwardmost center section and a forwardmost section where the convex section terminates, said opening in said rear wall extending from the rearwardmost center section to at least one area of the forwardmost section.

2. A vehicle as set forth in claim 1, further comprising a rear door pivotally mounted on said rear portion of said material containment vessel, said rear door forming said rear wall and having said opening therein.

3. A vehicle as set forth in claim 2, wherein said rear door has an outer surface, said tubular shell mounted on said outer surface of said rear door.

4. A vehicle as set forth in claim 3, wherein the outer surface of said rear door is convex.

5. A vehicle as set forth in claim 2, further comprising a hydraulic cylinder extending between said rear door and the rear portion of the material containment vessel for opening and closing said rear door.

6. A vehicle as set forth in claim 1, further comprising means for pivotally mounting said material containment vessel to said frame and at least one extensible lift cylinder extending between said frame and said material containment vessel for pivoting said material containment vessel relative to said frame.

7. A vehicle as set forth in claim 1, wherein the tubular shell is located substantially entirely outside of the interior of said material containment vessel.

8. A vehicle as set forth in claim 1, wherein said auger includes a rotatable shaft having first and second ends, and a helically wound blade mounted on said shaft, said first and second ends of said shaft respectively rotatably mounted to said first and second longitudinal ends of said tubular shell.

9. A vehicle as set forth in claim 1, wherein said auger includes a shaft having first and second ends and a helically wound blade having external edges, said auger further includes a generally cylindrical enveloping region along its length, the perimeter of which is defined by said external edges of said helically wound blade, at least a portion of said enveloping region of said auger at every cross-section along its entire length from said first end to said second end being located external of said interior of said vessel.

10. A vehicle for transporting and discharging materials, the vehicle comprising:

a frame;

a material containment vessel, said material containment vessel pivotally mounted to said frame and having an interior and a rear portion with a rear wall, said rear wall defining the rear end of the interior and including an opening therein;

a tubular shell, said tubular shell structurally attached to said material containment vessel and including first and second longitudinal ends, a discharge port, and an opening therein, said opening of said tubular shell in fluid communication with said opening of said material containment vessel;

an auger, said auger including a shaft having first and second ends and a helically wound blade having external edges, said auger further including a generally cylindrical enveloping region along its length, the perimeter of which is defined by said external edges of said helically wound blade, said auger extending through said opening of said rear wall of said material containment vessel and into the interior of said material containment vessel with at least a portion of said enveloping region of said auger at every cross-section along its entire length from said first end to said second end being located external of said interior of said vessel; and a motor for rotating the shaft to convey material from the interior of the material containment vessel to the discharge port;

wherein said opening in said tubular shell is located between said first and second longitudinal ends of the tubular shell, and wherein said rear wall is convex having a rearwardmost center section and a forwardmost section where the convex section terminates, said opening in said rear wall extending from the rearwardmost center section to at least one area of the forwardmost section.

11. A vehicle as set forth in claim 10, wherein said tubular shell completely surrounds said auger on both sides of said opening in said rear wall of said material containment vessel.

12. A vehicle as set forth in claim 11, wherein said first and second ends of said shaft are respectively rotatably mounted to said first and second longitudinal ends of said tubular shell.

13. A vehicle as set forth in claim 12, including upper and lower bearings proximate said first and second longitudinal ends of said tubular shell for rotatably mounting said rotatable shaft.

14. The vehicle as claimed in claim 10, further comprising means for pivotally mounting said material containment vessel to said frame, at least one extensible lift cylinder extending between said frame and said material containment vessel for pivoting said material containment vessel relative to said frame, a rear door having a convex outer surface and being pivotally mounted on said rear portion of said material containment vessel, and a hydraulic cylinder extending between said rear door and the rear portion of the material containment vessel for opening and closing said rear door, said rear door forming said rear wall and having said opening therein, said tubular shell mounted on said outer surface of said rear door and being located substantially entirely outside of the interior of said material containment vessel.

15. The vehicle as claimed in claim 10, wherein said first and second ends of said shaft are located external of the interior of said material containment vessel.

16. A vehicle for transporting and discharging materials, the vehicle comprising:

a frame;

a material containment vessel, said material containment vessel mounted to said frame and having an interior and a rear portion with a rear wall, said rear wall including an opening therein;

a tubular shell, said tubular shell structurally coupled to said material containment vessel and including first and second longitudinal ends, a discharge port, and an opening therein between said first and second longitudinal ends, said opening of said tubular shell in fluid communication with said opening of said material containment vessel, wherein tubular shell is located substantially entirely outside of the interior of said material containment vessel;

an auger, said auger extending at least partially through said opening of said rear wall of said material containment vessel and into the interior of said material containment vessel, said tubular shell encasing said auger on both sides of said opening in the rear wall;

a motor for rotating the auger to convey material from the interior of the material containment vessel through the tubular shell to be discharged out the discharge port; and means for pivotally mounting said material containment vessel to said frame and at least one extensible lift cylinder extending between said frame and said material containment vessel for pivoting said material containment vessel relative to said frame.

17. A vehicle as set forth in claim 16, further comprising a rear door pivotally mounted on said rear portion of said material containment vessel, said rear door forming said rear wall and having said opening therein.

18. A vehicle as set forth in claim 17, wherein said rear door has a convex outer surface, said tubular shell being mounted on said convex outer surface of said rear door.

19. A vehicle as set forth in claim 18, further comprising a hydraulic cylinder extending between said rear door and the rear portion of the material containment vessel for opening and closing said rear door.

20. A vehicle as set forth in claim 16, wherein said auger includes a rotatable shaft having first and second ends, and a helically wound blade mounted on said shaft having external edges, said first and second ends of said shaft respectively rotatably mounted to said first and second longitudinal ends of said tubular shell, said auger further includes a generally cylindrical enveloping region along its length, the perimeter of which is defined by said external edges of said helically wound blade, at least a portion of said enveloping region of said auger at every cross-section along its entire length from said first end to said second end being located external of said interior of said vessel.

21. A vehicle for transporting and discharging materials, the vehicle comprising:

a frame;

a material containment vessel, said material containment vessel mounted to said frame and having an interior and a rear portion with a rear wall, said rear wall including an opening therein;

a tubular shell, said tubular shell structurally coupled to said material containment vessel and including first and second longitudinal ends, a discharge port, and an opening therein between said first and second longitudinal ends, said opening of said tubular shell in fluid communication with said opening of said material containment vessel;

an auger, said auger extending at least partially through said opening of said rear wall of said material containment vessel and into the interior of said material containment vessel, said tubular shell encasing said auger on both sides of said opening in the rear wall;

a motor for rotating the auger to convey material from the interior of the material containment vessel through the tubular shell to be discharged out the discharge port; and means for pivotally mounting said material containment vessel to said frame and at least one extensible lift cylinder extending between said frame and said material containment vessel for pivoting said material containment vessel relative to said frame;

wherein said auger includes a shaft having first and second ends and a helically wound blade having external edges, said auger further includes a generally cylindrical enveloping region along its length, the perimeter of which is defined by said external edges of said helically wound blade, at least a portion of said enveloping region of said auger at every cross-section along its entire length from said first end to said second end being located external of said interior of said vessel.

22. A vehicle as set forth in claim 21, further comprising a rear door pivotally mounted on said rear portion of said material containment vessel, said rear door forming said rear wall and having said opening therein, wherein said rear door has a convex outer surface, said tubular shell mounted on said outer surface of said rear door, and a hydraulic cylinder extending between said rear door and the rear portion of the material containment vessel for opening and closing said rear door.

23. A vehicle for transporting and discharging materials, the vehicle comprising:

a frame;

a material containment vessel, said material containment vessel pivotally mounted to said frame and having an interior and a rear portion with a rear wall, said rear wall defining the rear end of the interior and including an opening therein;

a tubular shell, said tubular shell structurally attached to said material containment vessel and including first and second longitudinal ends, a discharge port, and an opening therein, said opening of said tubular shell in fluid communication with said opening of said material containment vessel;

an auger, said auger including a shaft having first and second ends and a helically wound blade having external edges, said auger further including a generally cylindrical enveloping region along its length, the perimeter of which is defined by said external edges of said helically wound blade, said auger extending through said opening of said rear wall of said material containment vessel and into the interior of said material containment vessel with at least a portion of said enveloping region of said auger at every cross-section along its entire length from said first end to said second end being located external of said interior of said vessel;

a rear door pivotally mounted on said rear portion of said material containment vessel, said rear door forming said rear wall and having said opening therein; and a motor for rotating the shaft to convey material from the interior of the material containment vessel to the discharge port.

24. A vehicle as set forth in claim 23, wherein said tubular shell completely surrounds said auger on both sides of said opening in said rear wall of said material containment vessel, said first and second ends of said shaft are respectively rotatably mounted to said first and second longitudinal ends of said tubular shell, and further including upper and lower bearings proximate said first and second longitudinal ends of said tubular shell for rotatably mounting said rotatable shaft.

25. The vehicle as claimed in claim 24, wherein said first and second ends of said shaft are located external of the interior of said material containment vessel.

26. The vehicle of claim 23, further comprising a wet and dry filtration and collection system.

27. The vehicle of claim 26, wherein said wet and dry filtration and collection system includes cyclone separators.

28. The vehicle as claimed in claim 27, wherein said first and second ends of said shaft are located external of the interior of said material containment vessel.

* * * * *